US006256892B1

(12) United States Patent
Gillson

(10) Patent No.: US 6,256,892 B1
(45) Date of Patent: Jul. 10, 2001

(54) CARPENTER'S PENCIL SHARPENER

(76) Inventor: Richard E. Gillson, 2135 Reno Cir., Cottonwood, AZ (US) 86326

( * ) Notice: Subject to any disclaimer, the term of this patent is extended or adjusted under 35 U.S.C. 154(b) by 0 days.

(21) Appl. No.: 09/556,207

(22) Filed: Apr. 24, 2000

(51) Int. Cl.[7] ........ B23L 23/06
(52) U.S. Cl. ........ 30/456; 30/451
(58) Field of Search ........ 30/456, 461, 451, 30/453, 455, 462

(56) References Cited

U.S. PATENT DOCUMENTS

| | | | |
|---|---|---|---|
| 741,857 | 10/1903 | Welker . | |
| 841,391 | 1/1907 | Hall . | |
| 1,051,658 | 1/1913 | Alkire . | |
| 1,531,738 | 3/1925 | Davis . | |
| 2,642,044 | 6/1953 | Mussguller . | |
| 2,982,253 * | 5/1961 | Herbold | 30/461 |
| 3,851,687 | 12/1974 | Jones . | |
| 4,081,010 | 3/1978 | Galli . | |
| 4,759,129 | 7/1988 | Alpha . | |
| 4,918,816 | 4/1990 | Alpha . | |
| 4,961,451 | 10/1990 | Bucci . | |
| 5,077,903 | 1/1992 | Kreim . | |

* cited by examiner

*Primary Examiner*—Douglas D Watts
(74) *Attorney, Agent, or Firm*—Frank J. McGue

(57) ABSTRACT

A carpenter's pencil sharpener for sharpening carpenter's pencils is disclosed. The pencil sharpener comprises a housing having both a vertically oriented oval shaped bore and a horizontally oriented oval shaped bore extending therethrough. The oval shapes of the bores corresponds to the profile of a carpenter's pencil. The bores are parallel and aligned with respect to each other. A cutting edge resiliently extends at an angle into the path of the bores. The angle of the cutting edge being adapted to allow a carpenter's pencil to be slid within said bore when inserted therein but whittling a carpenter's pencil when withdrawn therefrom.

7 Claims, 2 Drawing Sheets

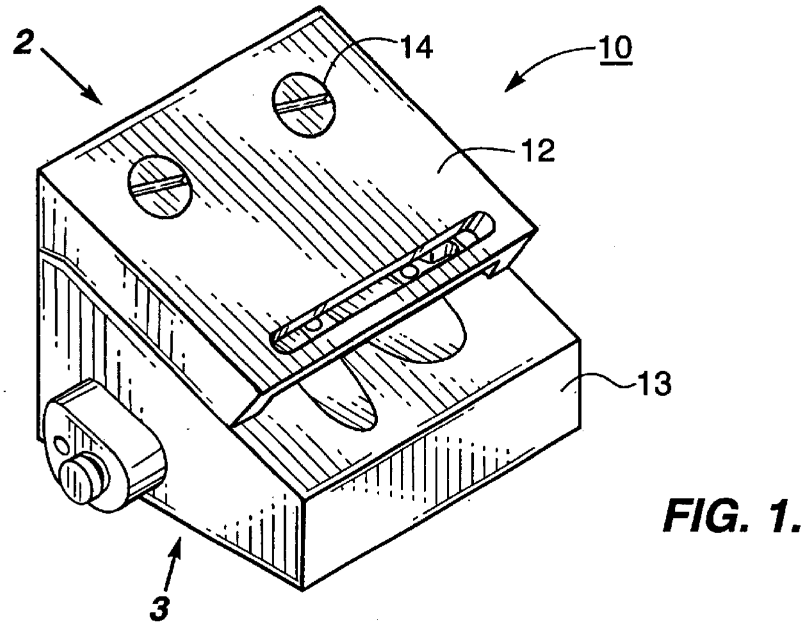
FIG. 1.
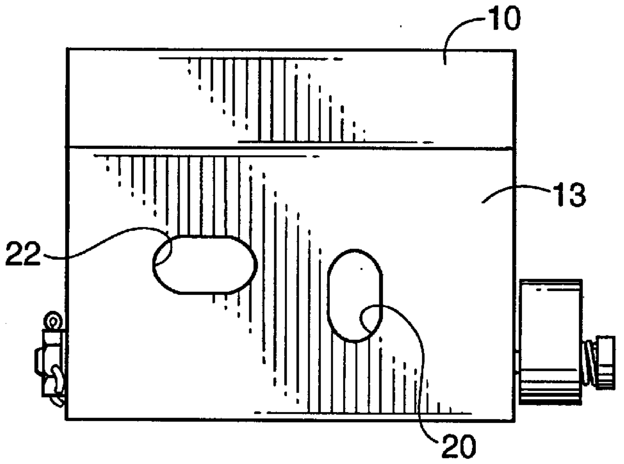
FIG. 2.
FIG. 3.
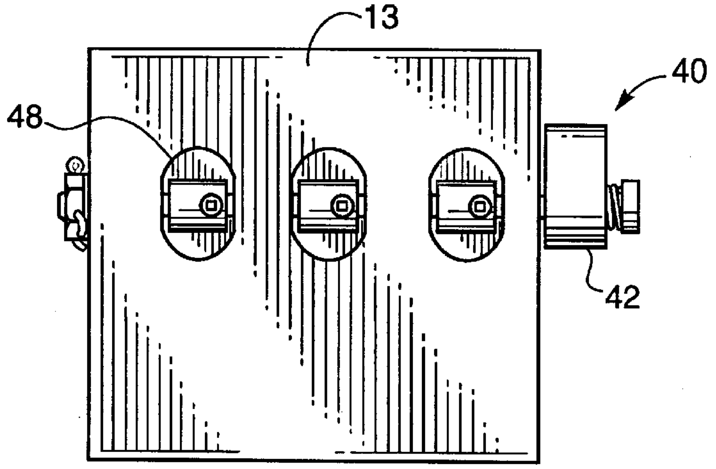

CARPENTER'S PENCIL SHARPENER

TECHNICAL FIELD

This invention relates to pencil sharpeners and, more particularly, pencil sharpeners adapted to sharpen the oval profile of a carpenter's pencil.

BACKGROUND OF THE INVENTION

Carpenter's pencils are used widely by carpenters, art students and any other persons who prefer to make very wide lines or shadings when making pencil drawings or markings. A standard carpenter's pencil presents a generally oval or rounded rectangular cross section. The pencils are made with a graphite lead core (of various hardness levels) surrounded by a wood covering.

While the carpenter's pencil is widely used, the problem remains how to sharpen such a pencil. The most common method is to whittle the pencil to form a rough point and then sandpaper same to the desired sharpness. In addition, differing manufacturers of carpenter's pencils may manufacture products having slightly different sizes. Thus, any device used to sharpen carpenter's pencils must be able to accommodate those variations in size.

There are a number of devices conceived to sharpen carpenter's pencils, ranging from the simple mechanism of placing a knife edge blade on a flat surface to very complex devices which sharpen all four sides simultaneously.

U. S. Pat. No. 5,077,903 entitled "Carpenter's Pencil Sharpener" which issued on Jan. 7, 1992 to Kreim discloses a motor operated carpenter's pencil sharpener having two rectangularly shaped openings, one a longitudinal opening the other a transverse opening. Two large diameter cylindrical cutting heads receive the long sides of the pencil, two small diameter cutting heads receive the short sides of the carpenter's pencil for sharpening.

U. S. Pat. No. 4,081,010 entitled "Pencil Sharpener For Non-Circular Section Pencils" which issued on Mar. 28, 1978 to Galli discloses a pencil sharpener for non-circular section pencils. A single cutting blade 9 is employed along with a series of cams.

U. S. Pat. No. 3,851,687 entitled "Pencil Sharpener" which issued on Dec. 3, 1974 to Jones discloses a pencil sharpener having spring biased cutting blades.

None of the known prior art disclose the device set forth herein.

SUMMARY OF THE INVENTION

It is an object of this invention to provide a simple, rugged, easy to use pencil sharpener for carpenter's pencils.

It is a further object of this invention to provide a simple carpenter's pencil sharpener which can acconmodate different sizes of carpenter's pencils.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWINGS

The present invention may be more readily described by reference to the accompanying drawings in which:

FIG. 1 is a front and side perspective view of the present invention;

FIG. 2 is a rear view of the present invention taken along line 2 of FIG. 1;

FIG. 3 is a bottom of the present invention taken along line 3 of FIG. 1;

DESCRIPTION OF THE PREFERRED EMBODIMENT

Figure 5:
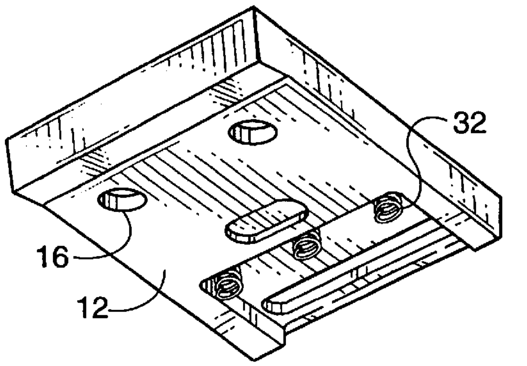
FIG. 5 is a bottom view of the top of the present invention taken along line 5 of FIG. 4.

Referring more particularly to the drawings by characters of reference, FIGS. 1–5 disclose a carpenter's pencil sharpener 10 comprising a housing 11 having, preferably, a top 12 mounted to a base 13, preferably by a pair machine screws 14 inserted through countersunk holes 16 in top 12 to engage corresponding threaded holes 18 in base 13.

Figure 4:
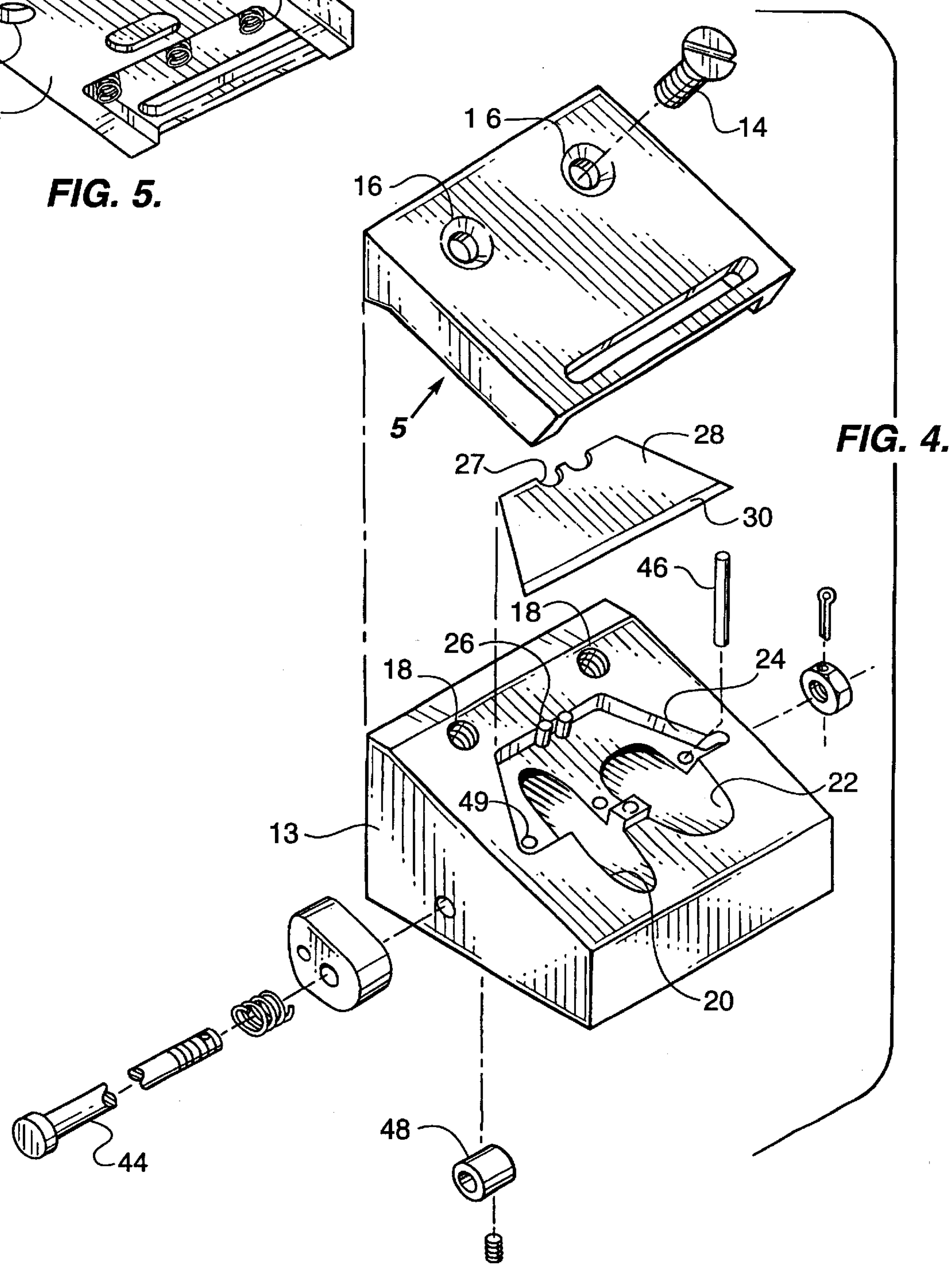
FIG. 4 is an exploded view of the present invention.

Carpenter's pencil sharpener 10 manually operated via a vertically oriented oval shaped bore 20 and a horizontally oriented oval shaped bore 22 extending from the rear of base 13 through the slanting top of base 13 as best seen in FIGS. 2 and 4. Oval shaped bores 20 and 22 dimensionally correspond to the profile of a carpenter's pencil which, unlike the circular profile of its more common cousins, has an oval shape or rounded rectangular profile. Additionally, bores 20 and 22 are parallel and aligned with respect to each other, A blade cavity 24 has two blade pins 26 which engage corresponding semicircular slots 27 of razor blade 28 and which, in combination with top 12, capture razor blade 28 therebetween. A cutting edge 30 of razor blade 28 is oriented opposite channel bores 20 and 22 but resiliently extends forwardly and downwardly into the path of both of said bores 20 and 22. Resiliency is provided by one or more springs 32, best seen in FIG. 5, which extending downwardly from top 12 to engage the upper surface of blade 28.

To use, a carpenter's pencil is inserted into one of said bores 20 or 22. Razor blade 28 is pushed upwardly by the mass of the pencil but is resiliently held to said pencil by springs 32 while allowing the pencil to slide freely. However, when the pencil is withdrawn, cutting edge 30 engages and whittles the tip of the pencil as springs 32 keeps edge 30 in firm contact with the pencil. The two bores 20 and 22 allow a user to sharpen both the long sides and the short sides of the oval profile of the pencil with one cutting edge.

While the use of springs 32 does allow the present invention to accommodate a variety of sizes of carpenter's pencils, on occasion, cutting edge 30 may slice too deeply into the carpenter's pencil to allow easy withdrawal of same. In the present invention bores 20 and 22 both extend fully through base 13 from the rear side to the front side thereof. This permits the user to push the carpenter's pencil forwardly completely through sharpener 10 to permit easy withdrawal in the event edge 30 cuts too deeply therein.

In addition, in the presently preferred embodiment and as best seen in FIGS. 2, 3 and 4, a cam mechanism 40 comprises a handle 42 operatively connected to an eccentric shaft 44 extending laterally across the bottom of base 13. At least one, and preferably three, pins 46 are mounted on cams 48 secured to shaft 44. In the preferred embodiment, two of the three pins 46 extend upwardly through pinholes 49 extending into cavity 24 on the outside of bores 20 and 22 while the third pin 46 and pinhole 49 are positioned between said bores 20 and 22. Pins 46 are adapted to engage the bottom of blade 28 and push it upward or downward allowing blade 28 to rise or drop depending on the position of eccentric shaft 44. The upward or downward movement of blade 28 within bores 20 and 22 allows the user to adjust for carpenter's pencils of differing sizes.

Although only certain embodiments have been illustrated and described, it will be apparent to those skilled in the art that various changes and modifications may be made therein without departing from the spirit of the invention or from the scope of the appended claims.

What is claimed is:

1. A carpenter's pencil sharpener for sharpening carpenter's pencils, the carpenter's pencil sharpener comprising:

a housing, the housing having a vertically oriented oval shaped bore and a horizontally oriented oval shaped bore extending therethrough, the oval shape of the bores corresponding to the profile of a carpenter's pencil, the bores being parallel and having one side thereof being aligned with respect to each other, a cutting edge resiliently extending at an angle into the path of the bores at the one side, the angle of the cutting edge adapted to allow a carpenter's pencil to be slid within each said bore when inserted therein but whittles a carpenter's pencil when withdrawn therefrom.

2. The carpenter's pencil sharpener of claim 1 further comprising one or more springs engaging said cutting edge to resiliently extend said cutting edge at an angle into the path of the bores.

3. A carpenter's pencil sharpener for sharpening carpenter's pencils, the carpenter's pencil sharpener comprising:

a housing, the housing having a vertically oriented oval shaped bore and a horizontally oriented oval shaped bore extending therethrough, the oval shape of the bores corresponding to the profile of a carpenter's pencil, the bores being parallel and aligned with respect to each other, a cutting edge resiliently extending at an angle into the path of the bores, the angle of the cutting edge adapted to allow a carpenter's pencil to be slid within said bore when inserted therein but whittles a carpenter's pencil when withdrawn therefrom, and a cam mechanism having a handle operatively attached to an eccentric shaft extending laterally through the housing perpendicular to the bores, at least one pin is mounted on a corresponding cam secured to the eccentric shaft, the at least one pin engaging the cutting edge to raise or lower the cutting edge within the bores as the eccentric shaft rotates.

4. The carpenter's pencil sharpener of claim 3 wherein the top and the base are secured to each other by at least one machine screw extending through countersunk holes in the top to corresponding threaded holes in the base.

5. The carpenter's pencil sharpener of claim 2 wherein the cutting edge is provided by a razor blade, the razor blade being mounted within a blade cavity on the base.

6. The carpenter's pencil sharpener of claim 3 wherein the housing has a top mounted to a base, the bores and the cutting edge mounted within said base, the one or more springs being mounted on the top.

7. A carpenter's pencil sharpener for sharpening carpenter's pencils, the carpenter's pencil sharpener comprising:

a housing, the housing having a top mounted to a base, the base having a vertically oriented oval shaped bore and a horizontally oriented oval shaped bore extending therethrough, the oval shape of the bores corresponding to the profile of a carpenter's pencil, the bores being parallel and aligned with respect to each other, a razor blade mounted within a blade cavity on the base, the razor blade having a cutting edge extending at an angle into the path of the bores, one or more springs mounted to the top engaging said cutting edge to resiliently extend said cutting edge into the path of the bores, the angle of the cutting edge adapted to allow a carpenter's pencil to be slid within said bore when inserted therein but whittles a carpenter's pencil when withdrawn therefrom, a cam mechanism having a handle operatively attached to an eccentric shaft extending laterally through the housing perpendicular to the bores, at least one pin is mounted on a corresponding cam secured to the eccentric shaft, the at least one pin engaging the cutting edge to raise or lower the cutting edge within the bores as the eccentric shaft rotates.

* * * * *